(12) United States Patent
Pinson et al.

(10) Patent No.: US 6,752,522 B2
(45) Date of Patent: Jun. 22, 2004

(54) OPTICAL OR STYLING COMPONENT FOR A LIGHTING OR INDICATOR DEVICE FOR A MOTOR VEHICLE

(75) Inventors: Ghislaine Pinson, Bobigny Cedex (FR); Régis Duplessy, Bobigny Cedex (FR)

(73) Assignee: Valeo Vision, Bobigny Cedex (FR)

( * ) Notice: Subject to any disclaimer, the term of this patent is extended or adjusted under 35 U.S.C. 154(b) by 0 days.

(21) Appl. No.: 10/033,082

(22) Filed: Dec. 27, 2001

(65) Prior Publication Data

US 2002/0093829 A1 Jul. 18, 2002

(30) Foreign Application Priority Data

Jan. 2, 2001 (FR) .............................................. 01 00048

(51) Int. Cl.[7] ................................................ F21V 5/00
(52) U.S. Cl. ...................... 362/520; 362/522; 362/540; 362/307; 362/308; 362/309; 362/311; 362/326

(58) Field of Search ................................. 362/520, 522, 362/540, 307, 308, 309, 311, 326, 336, 511, 538

(56) References Cited

U.S. PATENT DOCUMENTS 6,290,287 B1 * 9/2001 Guyomard .................. 296/194
6,464,382 B1 * 10/2002 Duflos ........................ 362/520

* cited by examiner

*Primary Examiner*—Sandra O'Shea
*Assistant Examiner*—Mark Tsidulko
(74) *Attorney, Agent, or Firm*—Morgan & Finnegan LLP

(57) ABSTRACT

The present invention relates to a component for a motor-vehicle lighting or indicator device. According to the invention, it consists of a transparent material within which light-diffusion foci consisting of local discontinuities are situated only at predetermined locations in order to diffuse the light emitted by a light source associated with the lighting or indicator device.

25 Claims, 4 Drawing Sheets

OPTICAL OR STYLING COMPONENT FOR A LIGHTING OR INDICATOR DEVICE FOR A MOTOR VEHICLE

FIELD OF THE INVENTION

The present invention relates to lighting and indicator devices for motor vehicles.

BACKGROUND OF THE INVENTION

Numerous cases arise in which the space available in a motor vehicle design is not sufficient for installing an indicator function. This is the case, for example, when several functions have to be grouped together into a single assembly of reduced volume, for example a housing including a dipped-beam headlamp, a main-beam headlamp, a direction indicator and a parking light, and when it is desired to install a supplementary or complementary function.

In the same way, cases may arise where the space available for installing a lighting or indicator function is limited, and where this function has to be installed in order to satisfy regulations. This is the case, for example, of a third stop light which, depending on the characteristics of a given vehicle, can only be installed within the passenger compartment of the vehicle, close to the rear window, this third stop light reducing visibility through this rear window.

Furthermore, considerations of styling are of growing importance, and are becoming a major preoccupation in terms of the design of motor-vehicle equipment in general, and of headlamps or indicator lights in particular, the designers always seeking new possibilities for aesthetic integration of these devices into the vehicle.

It is thus, for example, that masks, used in the first place to conceal either discontinuities between different components, for example between the reflector and the protective glazing of a headlamp, or parts having no optical function, such as the housing itself, are now used as decorative elements, by giving them particular appearances, for example a tint or a reflective coating, or particular configurations, for example reliefs or patterns, in order to obtain a novel aesthetic effect.

In contrast, the elements of the lighting or indicator device which participate in producing the light beam, that is to say the optical components, do not allow such freedom of styling. This is because the regulations in force stipulate that the light beams emitted by such devices must comply with constraints relating both to their geometric extent and to their photometric qualities, in terms of both luminous intensity and dominant color. All that is then possible is to give these optical components a very light tinting or coloring, so that the effect on the light beam emitted by the devices remains unnoticeable, and so that these tints or colorations are practically imperceptible.

DISCUSSION OF THE INVENTION

The present invention lies within this context, and its object is to propose a component for a lighting or indicator device the overall size of which is negligible or nil, so as to allow it to be easily installed in the spaces for these lighting or indicator devices where the volume is restricted and where it is nevertheless desired to make available a lighting, indicator or styling function, such a component having moreover to be simple to manufacture, while making it possible to obtain, on the one hand, a predetermined appearance for a headlamp or indicator light when they are turned off and, on the other hand, to modify the light beam emitted by the devices when the light source is lit in order to obtain a lighting or indicator function, the beam remaining in accordance with the regulations in force, such a device being furthermore inexpensive so as not to burden the cost of a headlamp or of a light.

Hence the object of the present invention is a component for a motor-vehicle lighting or indicator device.

According to the present invention, it consists of a transparent material within which light-diffusion foci, consisting of local discontinuities, are situated only at predetermined places in order to diffuse the light emitted by a light source associated with the lighting or indicator device.

According to other advantageous and non-limiting characteristics of the invention;
  the local discontinuities of the transparent material are created by irreversible modifications of the structure of individual volumes of the transparent material;
  the irreversible modifications of the structure of the individual volumes of the transparent material are obtained by focusing electromagnetic radiation;
  the electromagnetic radiation is laser radiation.

In a first embodiment, the component constitutes headlamp glazing. In this case,
  the light-diffusion foci diffuse the light rays originating from the light source of the headlamp and incident on the component;
  the light-diffusion foci diffuse the light rays originating from an auxiliary light source and propagating in the component by successive total reflections.

In another embodiment, the component constitutes an insert disposed in a motor-vehicle headlamp, the diffusion foci diffusing the light rays originating from an auxiliary light source.

In yet another embodiment, the component constitutes the converging lens of a headlamp the reflector of which has an elliptical section.

In yet another embodiment, the component constitutes an indicator strip light, the diffusion foci being distributed according to a predetermined pattern and diffusing the light rays emitted by at least one light source and propagating in the strip light by successive total reflections. In this case, the component can be partially metallized.

In one supplementary embodiment, the component of the invention constitutes a repeater light, repeating a lighting or indicator function, and it is associated with a specific light source, the turning-on and the turning-off of which are controlled simultaneously with the turning-on and turning-off of the light source of the function of which the component constitutes the repeater.

In another supplementary embodiment, the component of the invention itself constitutes a lighting device, being associated with a specific light source.

In all these embodiment,
  the diffusion foci have a size lying between 1 and 35 microns;
  the transparent material is plastic;
  the transparent material is glass.

The invention also proposes headlamps and indicator lights equipped with components as defined above.

Other objects, characteristics and advantages of the present invention will emerge clearly from the description which will now be given of an example embodiment given in a non-limiting way, by reference to the attached drawings.

DESCRIPTION OF THE PREFERRED EMBODIMENTS OF THE INVENTION

Figure 1A:
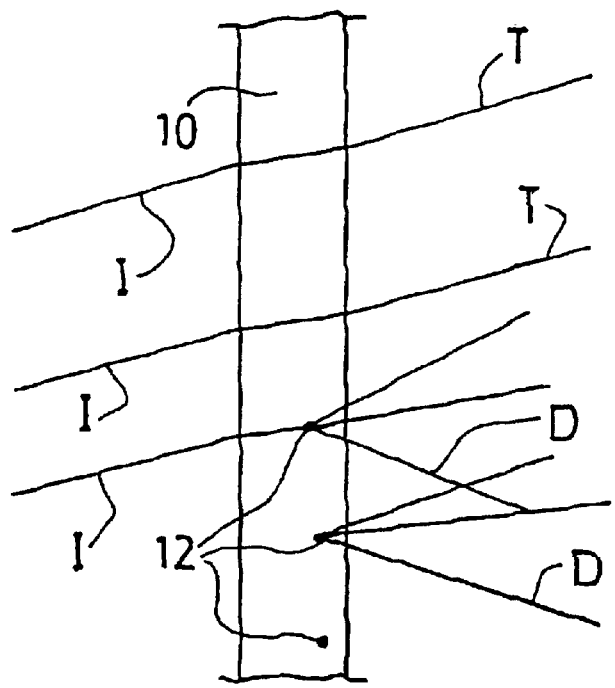
FIG. 1A represents a sectional view of an optical or styling component according to the present invention.
Figure 1B:
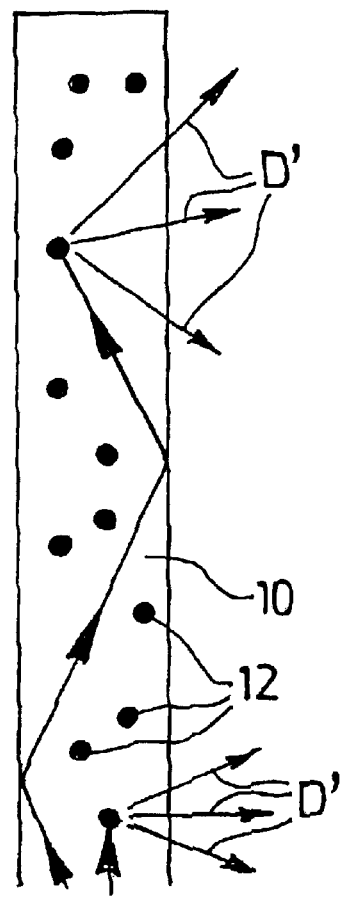
FIG. 1B represents a sectional view of the component of FIG. 1, under other conditions of use.

In FIGS. 1A and 1B show a sectional view of a component 10 according to an embodiment of the invention. This component 10 consists of a transparent material, for example glass or a plastic such as polymethylmethacrylate (PMMA) or polycarbonate (PC). The component 10 contains inclusions 12 arranged within this component 10.

In a known way, a beam of light rays I incident on the component 10 will give rise to a beam of transmitted light rays T, parallel to the incident rays I if the component 10 is a strip with parallel faces, and to diffused light rays D whenever a light ray I encounters a diffusion focus 12. The diffused rays 10 are emitted in all directions by the inclusions 12 acting as light-diffusion foci, as has been represented in FIG. 1A.

In a way which is also known, if the component 10 is used as a light guide, a light beam is input into the component 10 via at least one of its extremities, such that the light rays propagate in the component 10 by successive total reflections, until they encounter a diffusion focus 12, via which they then form rays diffused in all directions D' which can then emerge from the component 10, as has been represented in FIG. 1B.

In accordance with the present invention, the inclusions 12 are situated in the material constituting the component 10 at precisely predetermined locations, and only at these predetermined locations. As has been represented in FIG. 1A, the inclusions 12 may, for example, be arranged in a plane parallel to the faces of the component 10, which is closer to the exit face than to the entry face, these faces being equidistant from each other, and only in the lower part, when considering FIG. 1A. The inclusions 12 could be arranged in the material of the component 10 depending on the desired amount and the distribution of diffused light, as has been represented in FIG. 1B.

Figure 2:
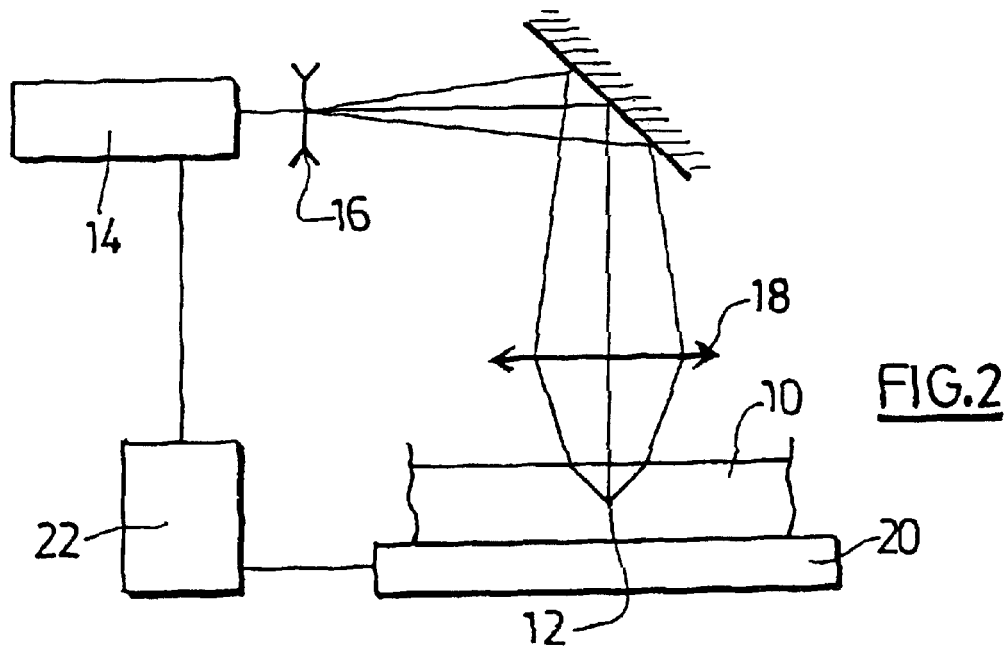
FIG. 2 represents an installation for producing the component according to the invention.

The inclusions 12 could be obtained by the use of an installation as represented in FIG. 2. In this figure is seen an electromagnetic-radiation emitter 14, for example a laser, which emits a beam of waves which are focused, by virtue of optical components 16 and 18, within the transparent material of the component 10. The latter is mounted on a mechanism plate 20, which is movable along the three orthogonal directions X, Y and Z, the movements of the mechanism plate 20 being controlled by a control unit 22, which also drives the emitter 14. The latter is preferably a laser emitting in the infrared.

In this way, the energy contained in the beam emitted by the emitter 14 is concentrated into an individual volume of the transparent material of the component 10, the dimensions of which are determined by the focusing optical component 18. Depending on the energy concentrated into this individual volume, that is to say on the time of exposure of the individual volume to this energy, on the value of this energy, and on the wavelength of the electromagnetic radiation, and depending on the material in question, irreversible modifications of the atomic, molecular and/or crystalline structure occur in the individual volume of transparent material thus exposed, such as localized melting then solidification, which are or are not accompanied by localized ionization, which disturb the structure of the material and result in a localized anisotropy or discontinuity in this individual volume, thus constituting a diffusion focus.

The diffusion focus thus created could be different depending on the nature of the material constituting the component 10. For example, in the case of glass or of a plastic such as PMMA, the diffusion focus is clear in appearance, and, in the case of a plastic such as polycarbonate, the diffusion focus is dark in appearance.

By virtue of such an installation, it is thus possible to position the point of focusing of the radiation originating from the emitter 14, and thus the discontinuity and the diffusion focus resulting therefrom, at any predetermined location within the material of the component 10, in order to obtain an optical or styling component including a predetermined arrangement of light-diffusion foci, in two or three dimensions, and obtaining the desired result in a lighting or indicator device for a motor vehicle.

Figure 3:
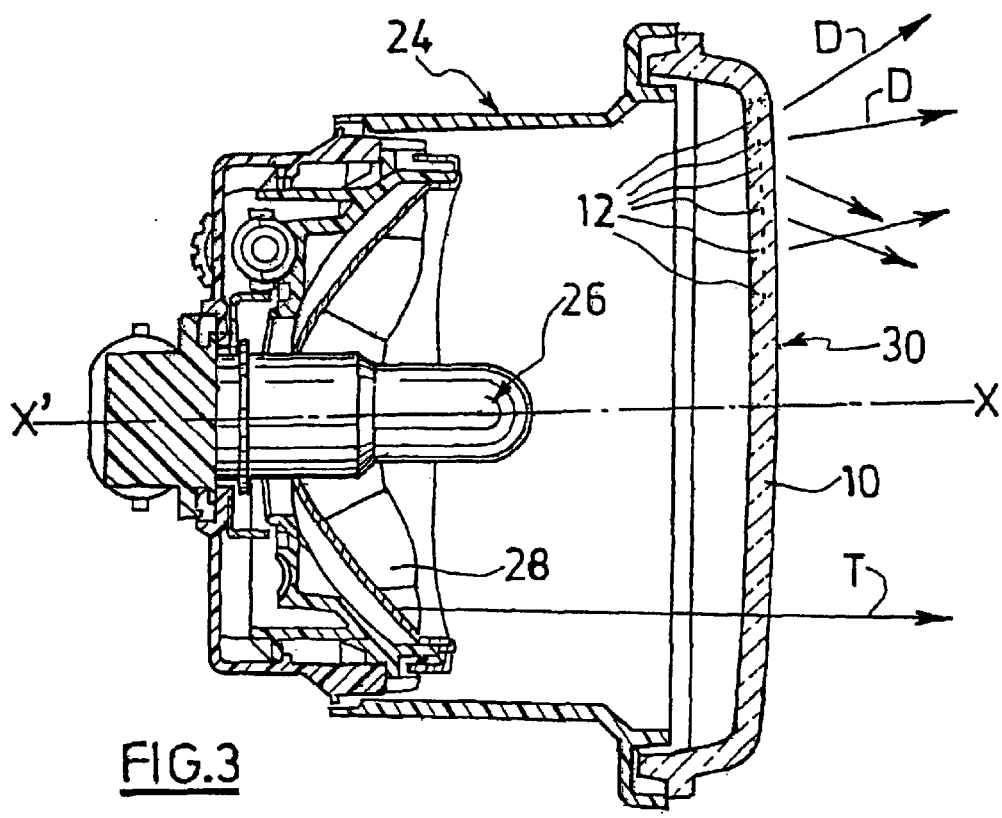
FIG. 3 represents a sectional view of a headlamp equipped with a component according to a first embodiment of the invention.

FIG. 3 shows a headlamp for a motor vehicle, including, in the conventional way, in a housing 24, a light source 26 working with a reflector 28 so as to form a main and/or dipped lighting beam, glazing 30 closing the housing leaktightly. Advantageously, the reflector 28 is able by itself to generate the regulatory light beam, such that the glazing 30 can be smooth or slightly deflecting and fulfill only the role of leaktight closure of the housing 24.

In accordance with the present invention, the glazing 30 consists of a component such as the one which has just been described, and includes discontinuities 12 at predetermined locations depending on the role which it is desired should be played by the light diffused by these diffusion foci 12.

For example, when the beam emitted by the headlamp is a dipped beam, that is to say a beam with upper cut-off in order not to dazzle drivers coming in the opposite direction, it is desired that some light should nevertheless be emitted upwards in order, for example, to illuminate road-sign panels situated above the roadway on gantries. By virtue of the invention, this can easily be achieved by forming, in the component 10 constituting the glazing 30, diffusion foci 12 in the upper part (when considering FIG. 3).

In this way, the dipped beam generated by the headlamp is practically unchanged, and propagates substantially in the direction of the optical axis X'-X thereof. However, the light rays reflected by the reflector 28 and incident on the diffusion foci 12 are diffused in all directions, and in particular upwards, so as to supply the desired light in this part of the space. Needless to say, the number and the concentration of the diffusion foci 12 will be chosen so that the beam of transmitted light rays T is again in accordance with the regulations, that is to say that it is not dazzling.

Figure 4:
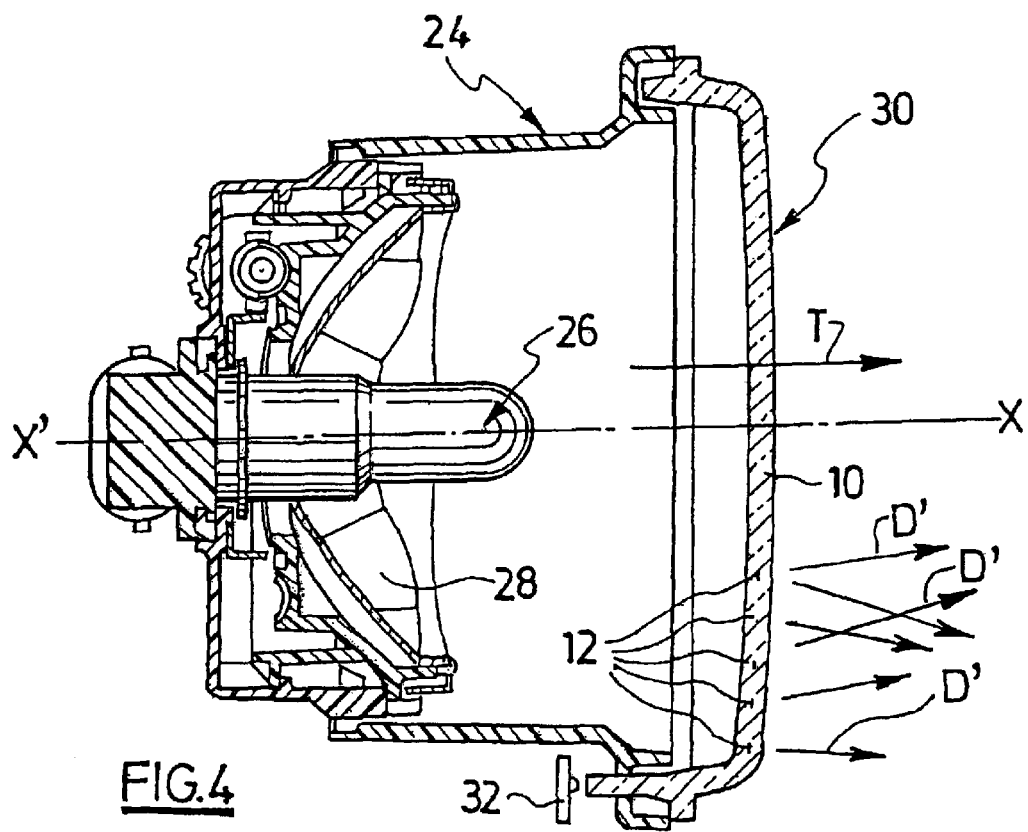
FIG. 4 represents a sectional view of a headlamp equipped with a component according to a second embodiment of the invention.

It may also be desired to add an indicator function to a headlamp which lacks it, for example a sidelight function or direction-change indicator function. The invention also makes it possible to incorporate this modification very easily. As can be seen in the second embodiment represented in FIG. 4, the component 10 constituting the glazing 30 of the headlamp is formed with diffusion foci 12 in a part, for example the lower part (when considering FIG. 4) of the glazing 30. Furthermore, an auxiliary light source 32 is associated with the glazing 30, in such a way that the light flux emitted by the source 32 penetrates into the glazing 30 and is propagated therein by successive internal reflections, in the manner of a light guide. The auxiliary light source 32 will advantageously consist of a light-emitting diode or of a row of light-emitting diodes, placed in the vicinity of at least one of its edges.

In this way, when the auxiliary light source 32 is turned on, the light rays emitted by it penetrate into the glazing 30 and are propagated therein until they encounter a diffusion focus 12. They are then diffused in all directions, and fulfill the desired supplementary function, as long as the number and the concentration of the diffusion foci is calculated so that the total light flux of the diffused rays D' is in accordance with the regulations relating to this function. For a direction-indicating function, the auxiliary light source and 32 could, for example, emit a beam of amber-colored light, in such a way that the diffusion foci diffuse this color only when the auxiliary light source 32 is turned on. For a sidelight function, the auxiliary light source 32 could emit a beam of white light. According to this embodiment, the diffusion foci 12 will be arranged in such a way as not to disturb the light beam of transmitted rays T generated when the light source 26 is turned on.

According to the two embodiments which have just been described, it would furthermore be possible to arrange for the diffusion foci 12 to be arranged in such a way as to have a given configuration, in order to form a particular aesthetic pattern while preserving their optical function.

One important advantage presented by the invention lies in the fact that the indicator function can be added to an already-existing component, and thus without changing its shape. It results therefrom that all the tooling necessary for its production and its installation into the headlamp can be retained. Only a supplementary stage of forming the diffusion foci can be implemented if necessary, this stage having only a very moderate influence on the final cost of the component.

Figure 5:
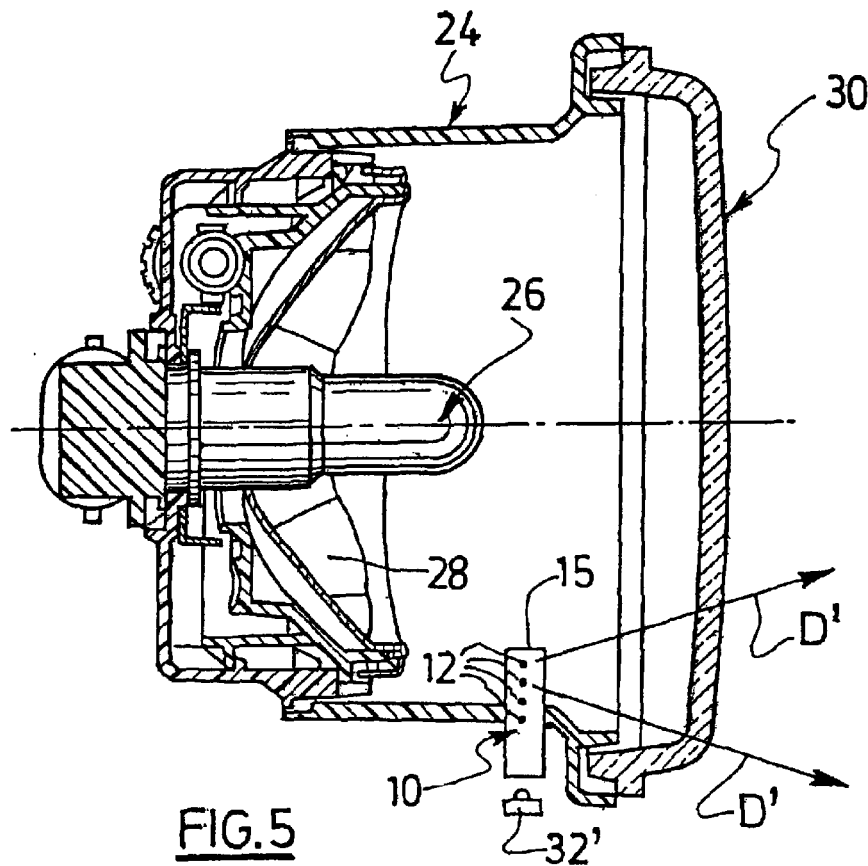
FIG. 5 represents a sectional view of a headlamp equipped with a component according to a third embodiment of the invention.

It is also possible to add a sidelight or direction-change indicator function to a headlamp according to the third embodiment represented in FIG. 5, in which the component 10 forms an insert 15 arranged in the headlamp, while being separate from the enclosing glazing 30, and at a place in this headlamp where it does not interfere with the light beam generated by the reflector 28, an auxiliary light source 32' being associated with the insert 15. Thus, when the auxiliary light source 32' is turned on, the light rays emitted by it penetrate into the insert 15 and are propagated therein until they encounter a diffusion focus 12. They are then diffused in all directions, and some of the diffused rays D' are directed towards the glazing 30 and outwards from the headlamp, where they fulfill the desired supplementary function if the number and the concentration of the diffusion foci is calculated so that the total luminous flux of the diffused rays D' is in accordance with the regulations relating to this function. As in the preceding embodiment, a direction-indicator function will be obtained with the aid of an auxiliary amber-colored light source 32', while a sidelight function will be obtained with an auxiliary light source 32' emitting a beam of white light.

According to this third embodiment, the auxiliary light source 32' could consist of a light source already having a function of its own. It could, for example, be the light source of the direction-change indicator, situated below the headlamp of FIG. 5. The component 10 then fulfils the function of repeater.

According to this third embodiment also, it would moreover be possible to provide for the diffusion foci 12 to be arranged in such a way as to have a given configuration, in order to form a particular aesthetic pattern while preserving their optical function. It would also be possible to make provision to metallise the face of the insert 15 opposite the one which is turned towards the glazing 30, so as to favor the direction of emission of the diffused rays D' towards the glazing 30 and outwards from the headlamp.

Figure 9:
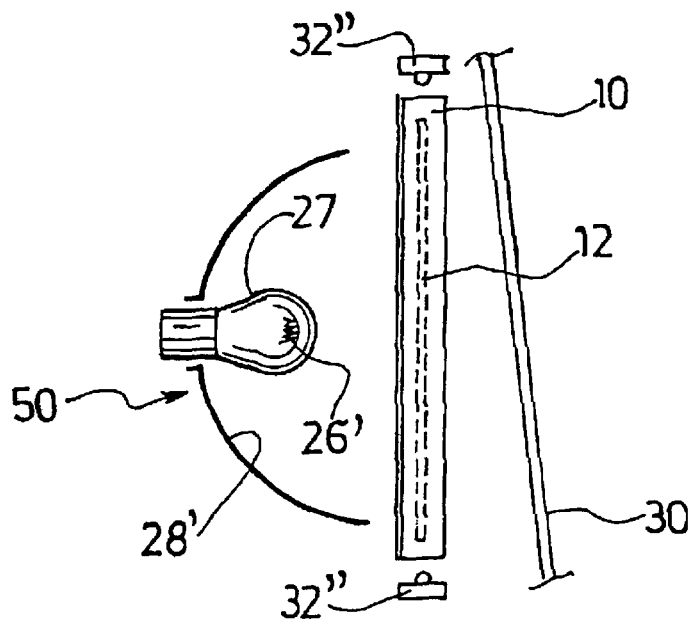
FIG. 9 represents a variant of FIG. 5.

FIG. 9 represents a variant of this third embodiment. This figure shows a lighting or indicator device 50, including a light source 26' such as the filament of an incandescent lamp in the example represented, working with a mirror 28' in order to form a lighting or indicator beam, a glazing 30 closing and sealing the housing (not represented in FIG. 9) containing the mirror 28'. A component 10 according to the present invention is arranged behind the glazing 30 so as to be traversed by the lighting or indicator beam. One or more auxiliary light sources 32" are associated with the component 10 in such a way that the latter behaves like a light guide, as in FIG. 1B.

When the light source or sources 32" are turned on, the light rays generated by these light sources undergo multiple reflections on the opposing faces of the component 10, until they encounter diffusion foci 12. They are then diffused in all directions, and in particular forwards, and rearwards, where they are then reflected forwards by the mirror 28'.

When the light source 26' is turned on, the light rays pass through the component 10, as represented in FIG. 1A, some of these rays being diffused by the diffusion foci 12.

In this way, when only the light sources 32" are turned on, a luminous flux will be emitted through the glazing 30, the color of this flux being fixed by that of the sources 20. When only the light source 26' is turned on, the luminous flux reflected by the mirror 28' will also be emitted through the component 10 and the glazing 30, the color of this flux being fixed by that of the bulb 27 of the lamp or that of an intermediate screen (not represented). It results therefrom that the functions fulfilled by the light sources 26' and 32' could be perfectly differentiated by their color or their brightness. The brightness given off by the filament 26' will preferably be greater then that of the light sources 32', such that, when the light sources 26' and 32' are turned on simultaneously, the total luminous flux meets the regulatory photometric requirements for the function fulfilled by the light source 26'.

The component 10 could, for example, fulfill the function of vehicle rear sidelight, and the filament 26' be that of a stop light, the photometries and colorimetries of these two functions each being in accordance with the regulations. By virtue of the invention, it is thus possible for the same surface of the glazing 30 to emit different light beams fulfilling different functions. The assembly in which the lighting or indicator device 50 and the component 10 are housed could therefrom be of a very small overall size.

Figure 6:
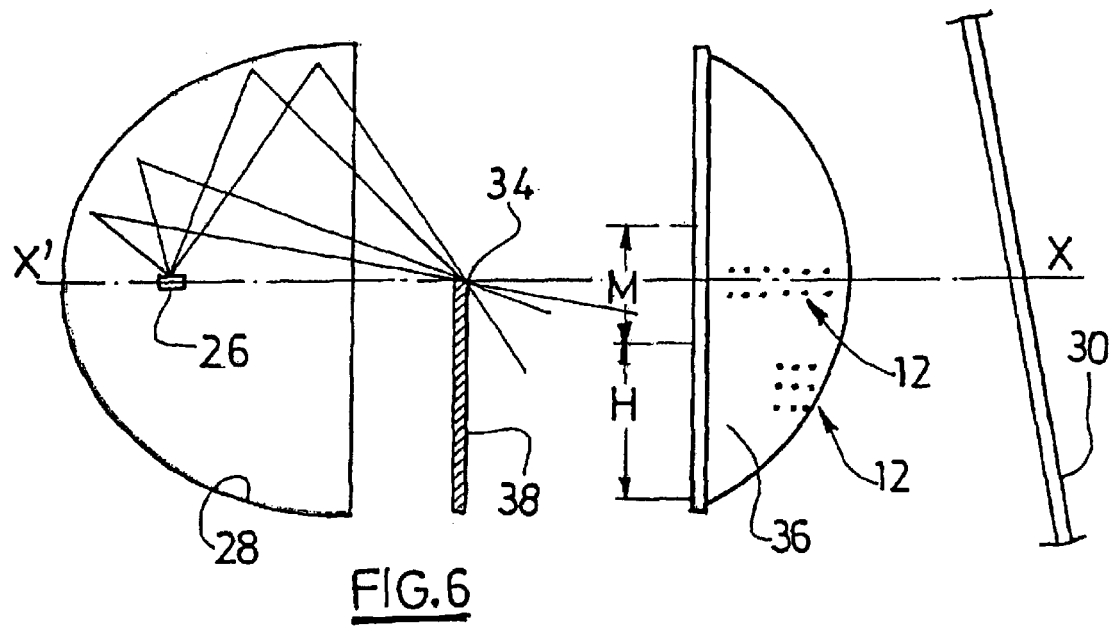
FIG. 6 represents a diagrammatic view in vertical section of a headlamp of the elliptical type incorporating a component according to the invention.

The invention also applies to headlamps of elliptical type, such as the one which is represented diagrammatically in FIG. 6. Such a headlamp typically comprises a light source 26 placed in the immediate vicinity of a first focus of a reflector 28 of elliptical section, in such a way that the rays emitted by the source 26 are concentrated at the second focus 34 of the mirror 28, coincident with the object focus of a plane/convex converging lens 36, a shade 38 having one horizontal edge perpendicular to the optical axis X'-X and defining the cut-off of the dipped beam in the X'-X axis. This assembly is contained in a housing (not represented) closed by glazing 30.

The glazing 30 could consist of the component 10 itself, the diffusion foci 12 diffusing the light from the light source 26 as in the first embodiment described above, or that from an auxiliary source 32, as in the second embodiment described above. The component 10 could also constitute an insert 15 arranged in the elliptical headlamp, as in the third embodiment described above.

The plane/convex lens 36 could itself also consist of the component 10 and could comprise diffusion foci 12 at predetermined locations, and at these locations only.

The diffusion foci 12 could, for example, be arranged in a region H of the lens 36 in such a way that the light diffused is emitted upwards so as, for example, to illuminate the direction indicator panels situated above the roadway on gantries. The diffusion foci 12 would then advantageously be formed in an appropriate area of the lens, for example a region H in its lower part (in FIG. 6).

The diffusion foci 12 could also be arranged in a region M of the central part of the lens 36, in a horizontal area close to the optical axis X'-X, in such a way as to blur the cut-off of the beam emitted by the elliptical headlamp and thus attenuate the change between the illuminated and unilluminated regions of the road in front of the vehicle. Needless to say, the lens 36 could comprise diffusion foci both in the regions H and M.

Figure 7:
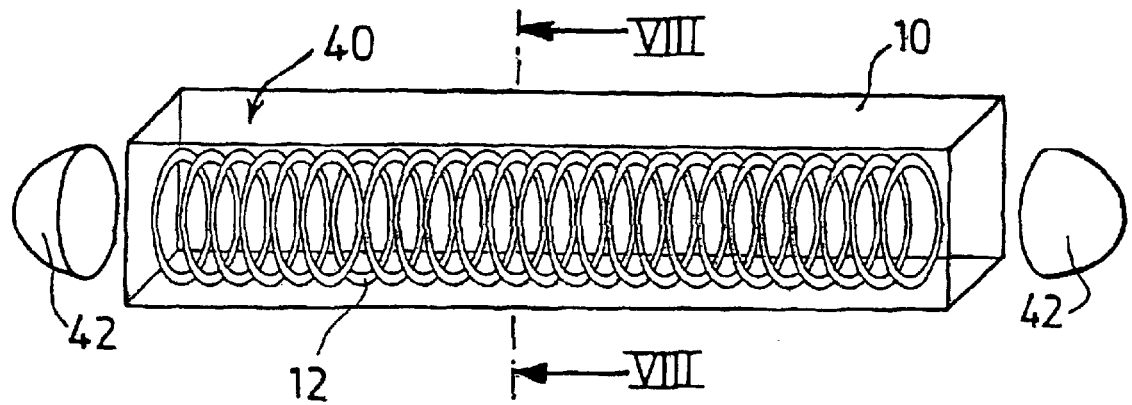
FIG. 7 represents a diagrammatic view in isometric perspective of an indicator device incorporating a component according to the invention.
Figure 8:
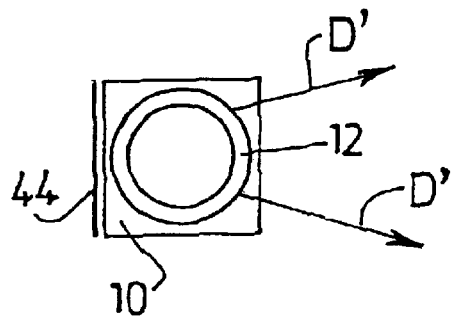
FIG. 8 represents a view in section along the line VIII—VIII of FIG. 7.

The invention also applies to indicator lighting, as has been represented in FIGS. 7 and 8. In these figures is seen an indicator strip light 40, made of glass or plastic, consisting of a component 10 according to the invention, in which the diffusion foci 12 have been distributed in a particular regular pattern. A light source 42, two in the example represented in FIG. 7, is arranged at one extremity of the strip, so that the strip 40 behaves like a light guide.

The light rays originating from the light source or sources 42 penetrate into the strip 40 and are propagated there by successive total reflections until they are incident on the diffusion focus 12, as was explained by reference to FIG. 1. Diffused rays D' are then emitted, which can emerge from the strip 40. By appropriate choice of the arrangement and the concentration of the diffusion foci 12, as well as of the brightness and the color of the luminous flux emitted by the light source or sources 42, it is possible to achieve the result that the sum total of diffused rays D' constitutes a sufficient luminous flux to fulfill an indicator function by itself, such as a third, raised stop light, for example, a flashing direction-change indicator, a tail light or else a lateral repeater.

One advantage presented by this embodiment lies in the fact that the indicator function thus implemented exhibits the thickness only of that of the strip 40, which can be very slight.

Another advantage lies in the fact that the indicator function thus implemented can exhibit an appearance, when the light sources 42 are turned off, of neutral hue, only the pattern consisting of the set of diffusion foci 12 being visible, and another appearance when the light sources 42 are turned on, the color being completely different from that of the appearance presented when the light sources 42 are turned off, depending on the indicator function undertaken by the strip 40.

In order to minimize the losses of light and to promote a preferential direction for the diffused rays D' emerging from the strip 40, it would advantageously be possible to provide for metallization 44 on at least one of the faces of the strip light 40, when the latter is of rectangular-box shape.

The present invention is not limited to the embodiments which have been described, but includes modifications which come within its scope. Thus, for example, the component of the present invention could be used as a luminous repeater of a lighting or indicator function, by being, for example, arranged on an element of the bodywork of the vehicle, such as a wing of this bodywork or the front part of an outside rear-view mirror of this vehicle. In this case, it could be associated with a specific light source, the turning-on and turning-off of which will be controlled simultaneously with the turning-on and the turning-off of the light source of the function of which the component constitutes the repeater. It could also by itself constitute a lighting device, for example a floor light providing interior lighting for the passenger compartment of the vehicle, or else a device for interior lighting of the glove box or of the baggage space, by being associated with a specific light source.

What is claimed is:

1. Component for a motor-vehicle lighting or signaling device, comprising a transparent material within which light-diffusion foci, including localized melting created using electromagnetic radiation on said material, and situated only at predetermined locations in order to diffuse the light emitted by a light source associated with the lighting or indicator device.

2. Component according to claim 1, wherein the localized melting of the transparent material is created by irreversible modifications of the structure of individual volumes of the transparent material.

3. Component according to claim 2, wherein the irreversible modifications of the structure of the individual volumes of the transparent material are obtained by the focusing of the electromagnetic radiation.

4. Component according to claim 3, wherein the electromagnetic radiation is laser radiation.

5. Component according to claim 1, comprising motor-vehicle headlamp glazing.

6. Component according to claim 5, wherein the light-diffusion foci diffuse the light rays originating from the light source of the headlamp and incident on the component.

7. Component according to claim 5, wherein the light-diffusion foci diffuse the light rays originating from an auxiliary light source and propagating in the component by successive total reflections.

8. Component according to claim 1, comprising an insert disposed in a motor vehicle headlamp, the diffusion foci diffusing the light rays originating from an auxiliary light source.

9. Motor-vehicle headlamp, incorporating a component as claimed in claim 8 as an insert.

10. Component according to claim 1, further comprising a converging lens and a reflector of a headlamp the reflector of which having an elliptical section.

11. Motor-vehicle headlamp, incorporating a component as claimed in claim 10 as a converging lens.

12. Component according to claim 1, comprising an indicator strip light, the diffusion foci being distributed according to a predetermined pattern and diffusing the light rays emitted by at least one light source and propagating in the strip light by successive total reflections.

13. Component according to claim 12, wherein the component is partially metallised.

14. Component according to claim 1, wherein the diffusion foci have a size of between 1 and 35 microns.

15. Component according to any one of claims 1 to 14 characterized in that the transparent material is plastic.

16. Component according to claim 1, wherein the transparent material is glass.

17. Motor-vehicle headlamp incorporating a component as claimed in claim 1 as glazing.

18. Indicator light for a motor-vehicle, incorporating a component as claimed in claim 1.

19. Component according claim 1, comprising a repeater light, adapted for repeating a lighting or indicator function, and wherein it is associated with a specific light source, the turning-on and the turning-off of which are controlled simultaneously with the turning-on and turning-off of the light source of the function of which the component constitutes the repeater.

20. Component according to claim 1, wherein the component itself constitutes a lighting device and is associated with a specific light source.

21. Component for a motor-vehicle lighting or signaling device, comprising motor vehicle headlamp glazing and a transparent material within which light-diffusion foci, including local discontinuities created using electromagnetic radiation on said material, and situated only at predetermined locations in order to diffuse the light emitted by a light source associated with the lighting or indicator device, wherein the light diffusion foci diffuse the light rays originating from an auxiliary light source and propagating in the component by successive total reflections.

22. Component for a motor-vehicle lighting or signaling device, comprising a transparent material within which light-diffusion foci, including local discontinuities created using electromagnetic radiation on said material, and situated only at predetermined locations in order to diffuse the light emitted by a light source associated with the lighting or indicator device and further comprising an insert disposed in a motor vehicle headlamp, the diffusion foci diffusing the light rays originating from an auxiliary light source.

23. Component for a motor-vehicle lighting or signaling device, comprising a transparent material within which light-diffusion foci, including local discontinuities created using electromagnetic radiation on said material, and situated only at predetermined locations in order to diffuse the light emitted by a light source associated with the lighting or indicator device, and further comprising an indicator strip light, the diffusion foci being distributed according to a predetermined pattern and diffusing the light rays emitted by at least one light source and propagating in the strip light by successive total reflections, wherein the component is partially metallised.

24. Component for a motor-vehicle lighting or signaling device, comprising a transparent material within which light-diffusion foci, including local discontinuities created using electromagnetic radiation on said material, and situated only at predetermined locations in order to diffuse the light emitted by a light source associated with the lighting or indicator device and further comprising a converging lens of a headlamp, the reflector of which having an elliptical section, wherein a component is incorporated as a converging lens.

25. Component for a motor-vehicle lighting or signaling device, comprising a transparent material within which light-diffusion foci, including local discontinuities created using electromagnetic radiation on said material, and situated only at predetermined locations in order to diffuse the light emitted by a light source associated with the lighting or indicator device and further comprising a repeater light, adapted for repeating a lighting or indicator function, and wherein it is associated with a specific light source, the turning-on and the turning-off of which are controlled simultaneously with the turning-on and turning-off of the light source of the function of which the component constitutes the repeater.

* * * * *